United States Patent
Johri et al.

(10) Patent No.: US 9,174,649 B1
(45) Date of Patent: Nov. 3, 2015

(54) REDUNDANCY FOR AUTOMATED VEHICLE OPERATIONS

(71) Applicant: Ford Global Technologies, LLC, Dearborn, MI (US)

(72) Inventors: Rajit Johri, Ann Arbor, MI (US); Andrew Brown, Canton, MI (US); Scott J. Lauffer, Northville, MI (US); Sarra Awad Yako, Allen Park, MI (US); Shane Elwart, Ypsilanti, MI (US); Douglas Scott Rhode, Farmington Hills, MI (US); Alex Maurice Miller, Canton, MI (US); Tobias John Pallett, Farmington, MI (US); John A. Lockwood, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/293,178

(22) Filed: Jun. 2, 2014

(51) Int. Cl.
*B60W 50/00* (2006.01)
*B60T 7/12* (2006.01)
*B62D 6/00* (2006.01)

(52) U.S. Cl.
CPC *B60W 50/00* (2013.01); *B60T 7/12* (2013.01); *B62D 6/00* (2013.01)

(58) Field of Classification Search
CPC ..... B60W 10/00; B60W 37/06; B60W 10/04; B60W 10/06; B60W 10/08; B60W 10/10; B60W 10/119; B60W 10/12; B60W 10/18; B60W 10/182; B60W 10/20; B60W 10/22; B60W 10/30; B60W 30/188; B60W 30/1886; B60W 30/1888
See application file for complete search history.

(56) References Cited

U.S. PATENT DOCUMENTS

| | | | |
|---|---|---|---|
| 5,513,107 A * | 4/1996 | Gormley | 701/48 |
| 6,256,568 B1 | 7/2001 | Siepker et al. | |
| 8,078,338 B2 | 12/2011 | Pack et al. | |
| 8,340,863 B2 * | 12/2012 | Karatsinides | 701/36 |
| 2003/0139855 A1 * | 7/2003 | Hess et al. | 701/1 |
| 2005/0189161 A1 * | 9/2005 | Zheng et al. | 180/402 |
| 2007/0050661 A1 * | 3/2007 | Ferren et al. | 714/1 |
| 2007/0101236 A1 * | 5/2007 | Bauerle et al. | 714/763 |
| 2007/0168104 A1 * | 7/2007 | Nelson et al. | 701/93 |
| 2008/0208426 A1 | 8/2008 | Iwasaki et al. | |
| 2010/0017542 A1 * | 1/2010 | Merry et al. | 710/15 |
| 2010/0030409 A1 | 2/2010 | Smith et al. | |
| 2011/0130906 A1 * | 6/2011 | Mayer | 701/22 |
| 2011/0130916 A1 * | 6/2011 | Mayer | 701/33 |
| 2012/0144270 A1 * | 6/2012 | Diggs et al. | 714/769 |

FOREIGN PATENT DOCUMENTS

CN 201784623 U 4/2011

* cited by examiner

*Primary Examiner* — Mary Cheung
*Assistant Examiner* — Rodney Butler
(74) *Attorney, Agent, or Firm* — Frank A. MacKenzie; Bejin Bieneman PLC

(57) ABSTRACT

A vehicle sub-system controller is configured to receive a first message and a second message, wherein the first message includes at least a command for the controller, and the second message includes at least a target value for the controller to achieve. A fault may be detected with respect to the first message; and an adjustment to the sub-system may be locally determined in the sub-system controller to achieve the target value.

24 Claims, 3 Drawing Sheets

REDUNDANCY FOR AUTOMATED VEHICLE OPERATIONS

BACKGROUND

A vehicle computer may be configured to send instructions to various local controllers, e.g., controlling speed, acceleration, deceleration, steering, etc., e.g., the vehicle computer may provide for the vehicle to be driven autonomously or semi-autonomously. If a fault occurs in the computer, one or more sensors providing input to the computer, a vehicle communication system, etc., fault, then the vehicle may need to have a driver take control of an affected vehicle system, e.g., braking, powertrain, steering, etc. Where a fault occurs in a communication system providing information to a local controller and/or when a sensor or the like fails and the computer is unable to obtain information needed to provide an instruction to a local controller, then the local controller has no further information to rely on and, in presently practiced implementations, will default to a nominal set point.

Unfortunately, this nominal set point is generally not desirable for all scenarios in which a fault occurs, and can therefore result in a vehicle incident such as a collision, crash, etc. To take one specific example, if a steering controller loses communications during a turning operation, the steering controller is generally configured to reset a vehicle steering angle to zero degrees almost instantaneously. This nominal set point is generally not desirable while a vehicle is turning, however, and can result in a vehicle crash with minimal and very often insufficient time for a human driver to intervene and correct the vehicle steering angle.

Further, it is known to avoid communication failures such as described above by implementing a vehicle communication system having a redundant communications channel between a vehicle computer managing driving operations and a local controller. However, implementing such redundancy is in practically expensive and would require significant and impractical architectural changes in existing vehicle controllers.

DRAWINGS

DESCRIPTION

Introduction

Figure 1:
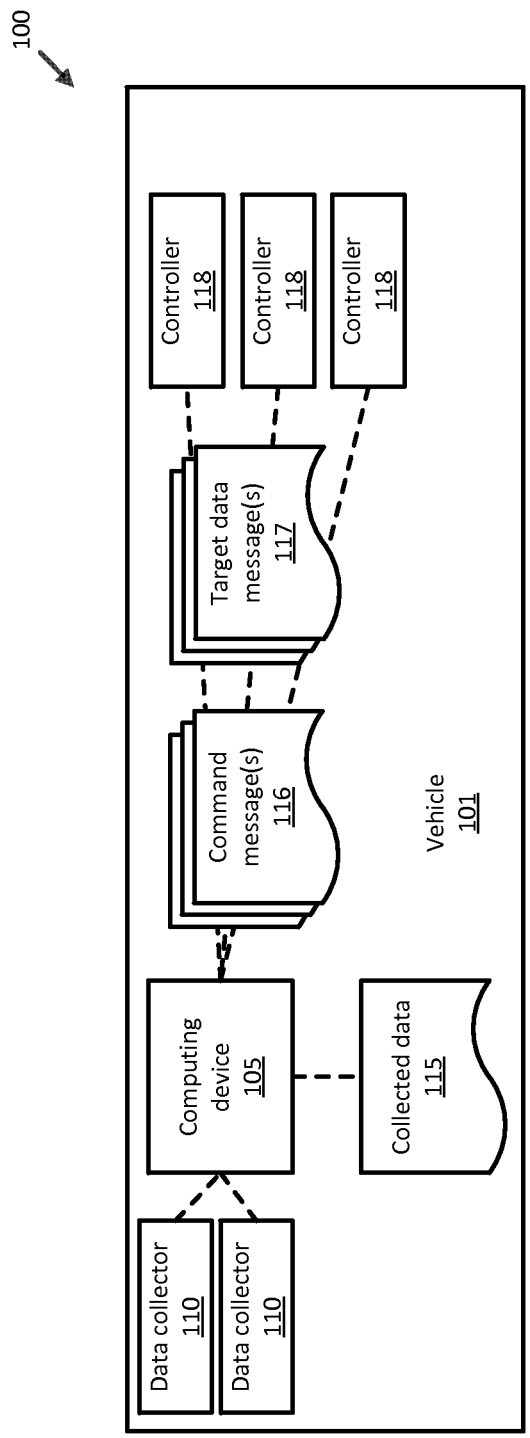
FIG. 1 is a block diagram of an exemplary autonomous vehicle sensing system.

FIG. 1 is a block diagram of an exemplary autonomous vehicle system 100 that includes a vehicle 101 provided with a computing device 105 including a processor and a memory, the memory storing instructions executable by the processor for executing one or more automated driving operations. The computer 105, via a communications mechanism in the vehicle 101, such as a controller area network (CAN) bus or the like, may provide various command messages 116 as well as target data messages 117 to vehicle 101 sub-system controllers 118. A command message 116 includes a conventional instruction or command to a controller 118, e.g., an instruction for a specified steering angle to a steering controller 118, whereas a target data message 117 includes one or more target quantities for the controller 118 to achieve, e.g., a specified steering curvature, as well as possibly parameters for achieving the one or more target quantities, e.g., a time parameter, a distance parameter, boundaries for a specified target quantity, etc.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. The computer 105 may be configured, i.e., include in its memory instructions executable by its processor, For example, the computer 105 generally includes, and is capable of executing, instructions to select an autonomous operation mode, to adjust an autonomous operation mode, to change an autonomous operation mode, etc., of the vehicle 101.

In addition, the computer 105 may be configured for communicating with various components in the vehicle 101, such as data collectors 110, e.g., vehicle 101 sensors, controllers 118, a human machine interface (HMI), or the like, etc. Accordingly, the computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms that may provide an in-vehicle network, the computer 105 may transmit messages to various controllers 118, data collectors 110, and/or devices in a vehicle and/or receive messages 116, 117 from the various devices, e.g., controllers 118, actuators, data collectors 110, etc. Alternatively or additionally, in cases where the computer 105 actually comprises multiple devices, the CAN bus or the like may be used for communications between devices represented as the computer 105 in this disclosure.

Generally included in instructions stored in and executed by the computer 105 are instructions for performing certain automated operations, e.g., steering, braking, speed control, etc. For example, the computer 105 may include instructions to provide command messages 116 to one or more controllers 118 to perform such operations. For example, a command message 116 may be provided in a known manner as a CAN message or the like. For example, an electronic power assist steering (EPAS) controller 118 could receive a message 116 to establish and/or maintain a certain steering angle. Yet further for example, a powertrain or engine control module (PCM or ECM) 118 could receive a message 116 to establish and/or maintain a certain acceleration and/or required torque. Even further for example, an antilock braking system (ABS) controller 118 could receive a message 116 to apply vehicle 101 brakes to decelerate the vehicle 101 at a certain rate and/or reduce vehicle 101 speed to a certain acceleration and/or required torque. In addition, as discussed further below, the computer 105 may include instructions to provide target data messages 117 to a controller 118 for use upon detection of a fault with respect to a command message 116.

Data collectors 110 may include a variety of devices. For example, various sensors in a vehicle may operate as data collectors 110 to provide collected data 115 via the CAN bus, e.g., collected data 115 relating to vehicle speed, acceleration, etc. Exemplary sensors include image (e.g., cameras), radar, lidar, ultrasonic, etc., sensors. Further, global positioning system (GPS) equipment, etc., could be included in a vehicle and configured as data collectors 110 to provide data directly to the computer 105, e.g., via a wired or wireless connection.

A memory of the computer 105 generally stores collected data 115. Collected data 115 may include a variety of data collected in a vehicle 101 from data collectors 110. In general, collected data 115 may include any data that may be gathered by a collection device 110 and/or computed from such data. Further, collected data 115 could be provided from a controller 118, e.g., related to engine speed, vehicle 101 speed, etc. Accordingly, collected data 115 could include a variety of data 115 related to vehicle 101 operations and/or performance, as well as data related to in particular relating to motion of the vehicle 101. For example, collected data 115 could include data concerning a vehicle 101 speed, acceleration, braking, etc.

As mentioned above, command messages 116 may be provided according to known mechanisms and in known formats, e.g., using CAN communications to provide known and/or conventional commands to one or more vehicle 101 controllers 118. Target data messages 117 may be provided along with order in addition to messages 116, and include additional information for use by a controller 118. A target message 117 for a controller 118 may include the following components:

- A target value for the controller 118, e.g., a target speed, acceleration, deceleration, target curvature for steering the vehicle 101, wheel torque, output shaft torque, engine torque, steering wheel angle, etc. Further, a target value could be provided along with a series of relative or absolute values with corresponding time and/or distance traveled parameters according to which the target value, such as one of the foregoing, could be estimated.
- A time parameter, e.g., an amount of time during which the target value should be achieved.
- A distance parameter, e.g., an amount of distance traveled by the vehicle 101 over which the target value should be achieved.
- A function and/or function coefficients for use in achieving the target value using the time parameter and/or the distance parameter, e.g., a memory of the controller 118 may store a piecewise function or the like and/or such may be provided in a message 117, specifying how the target value may be achieved as a function of time and/or distance, whereupon a target message 117 may, possibly in addition to the function itself, specify coefficients for such function.
- Parameter boundaries, i.e., permissible limits for certain data values while a target value is being achieved. For example, if the target value provided to a braking controller 118 is a velocity, i.e. speed, a deceleration parameter boundary may be provided specifying a maximum permissible rate of deceleration for the vehicle 101. Other exemplary parameter boundaries include acceleration rate, a steering angle, etc.
- Collected data 115 that could be used to support controller 118 actuation logic. One example of such collected data 115 includes navigation information specifying a vehicle 101 location along with a type of road, lane occupied by the vehicle 101, etc. Another example of such collected data 115 includes data relating to potential stationery and/or moving obstacles in front of or near the vehicle 101, e.g., as detected by a camera, radar, lidar, etc., and identified by the computer 105.

As discussed below, a target message 117 must include a target value or some information according to which a controller 118 can determine a desired target value. However, other elements of a message 117 may be omitted in some implementations. Further, a target message 117 could include two or more target values and two or more corresponding time and/or distance parameters, as well as a piecewise function with sub-functions corresponding to the different respective target values and time and/or distance parameters. An example of a target message with multiple target values is discussed below.

Examples of controllers 118 have been provided above, further, as alluded to above, the controller 118 generally includes a processor and a memory, the memory storing instructions that can be executed by the processor. Further, a controller 118 memory may store various data, e.g., as received in messages 116, 117. For example, target values generated as data 115 could be stored in a memory of a controller 118, whereupon the controller 118 may use last known target values in the event of a fault in a message 117. Moreover, a controller 118 may be communicatively coupled to a vehicle 101 communications network, e.g., a CAN bus, as well as to devices such as actuators, data collectors 110, etc.

Process Flows

Figure 2:
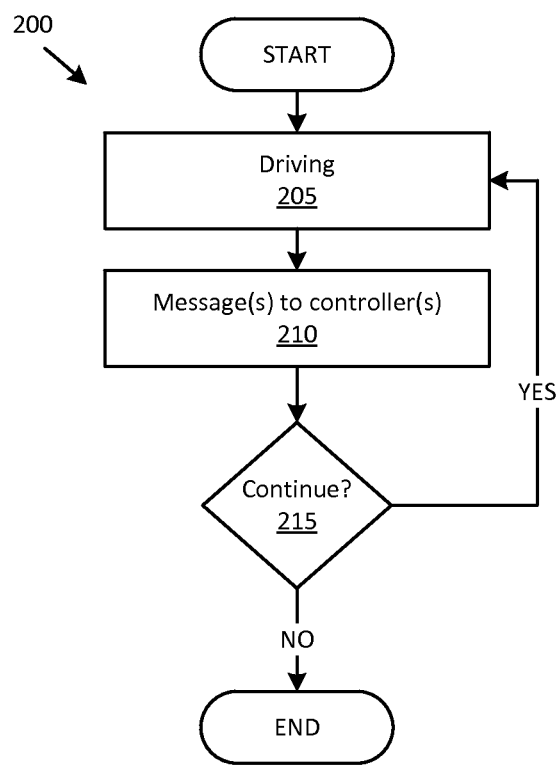
FIG. 2 is a diagram of an exemplary process for a vehicle computer to provide command messages and target data messages to one or more vehicle controllers.

FIG. 2 is a diagram of an exemplary process 200 for a vehicle 101 computer 105 to provide command messages 116 and target data messages 117 to one or more vehicle 101 controllers 118. The process 200 may begin in a block 205 when a vehicle 101 begins or continues driving operations.

As part of such driving operations, as discussed above, certain operations of the vehicle 101 may be directed by the computer 105 providing commands in messages 116 to one or more controllers 118. Such command messages 116 may be provided in a block 210, along with target data messages 117, as described above.

In a block 215, following the block 210, the computer 105 determines whether the process 200 should continue. For example, a vehicle 101 ignition may be turned off, resulting in the computer 105 being powered down, whereupon the process 200 ends. Otherwise, the process 200 returns to the block 205.

Figure 3:
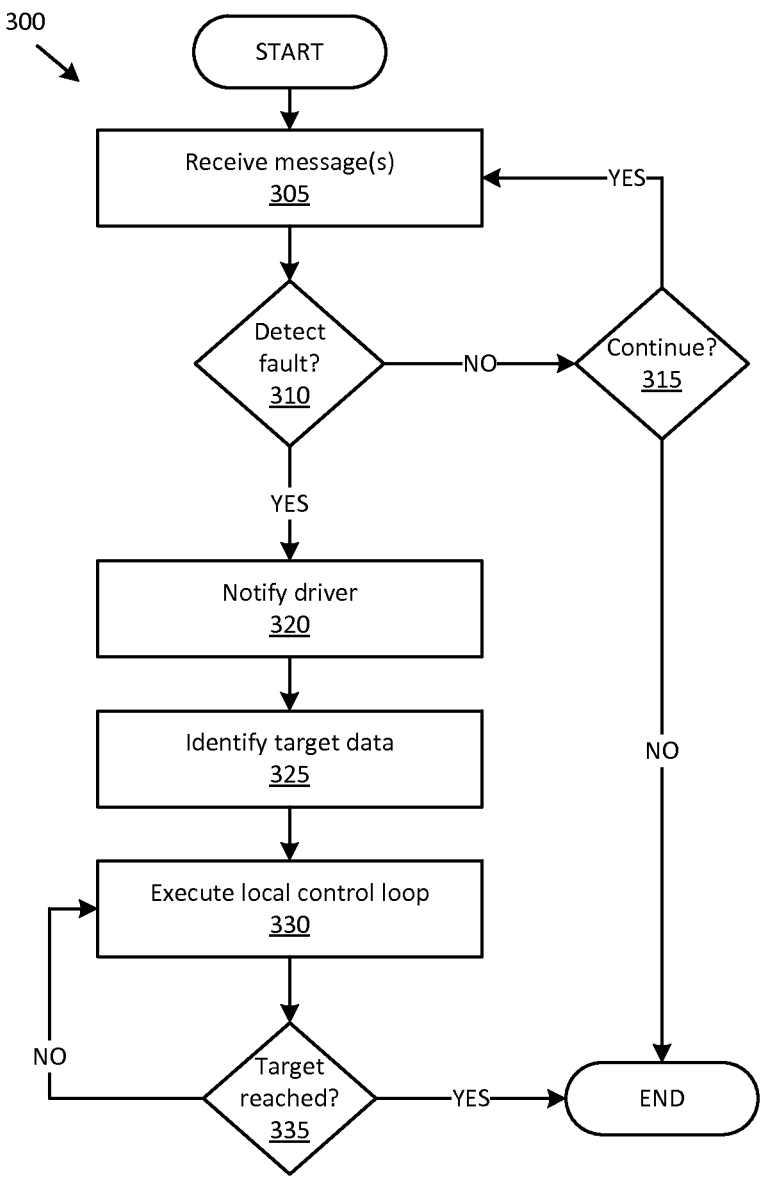
FIG. 3 is a diagram of an exemplary process for a vehicle controller to use provided target data to control a vehicle subsystem upon detecting a fault in the receipt of command messages.

FIG. 3 is a diagram of an exemplary process 300 for a vehicle 101 controller 118 to use provided target data to control a vehicle 101 subsystem, e.g., brakes, powertrain, steering, upon detecting a fault in the receipt of command messages 116.

The process 300 begins in a block 305, in which the controller 118 receives messages 116, 117, from the vehicle computer 105, e.g., via a CAN bus or the like.

Next, in a block 310, the controller 118 determines whether a fault is detected in receiving a command message 116. For example, the controller 118 may detect that a message 116 was not received at all. Alternatively or additionally, the controller 118 may detect an error in a message 116 using a conventional error detection mechanism, e.g., checksum or the like, suggesting that a command and/or other data in the message 116 cannot be relied upon. Yet further additionally or alternatively, a fault could arise when the computer 105 fails to receive collected data 115 needed to provide an instruction in a command message 116. Such failure could occur due to a network or other can indication failure in the vehicle 101, due to failure of a data collector 110, etc. Yet further alternatively or additionally, the computer 105 could detect a fault that is sometimes referred to as a sending system fault, e.g., a fault in a data collector 110 and/or data 115, and/or an ability of the computer 105 to send a message 116, whereupon the computer 105 could self-report such fault to one or more controllers 118. In any case, if a fault is not detected in a message 116, then a block 315 is executed next. Otherwise, the process 300 proceeds to a block 325.

In the block 315, the controller 118 determines whether the process 300 should continue. For example, upon receipt of a shutdown command or the like, it may be determined that the process 300 should end. However, operation of the controller 118 and the process 300 may continue by returning to the block 305.

In the block 320, the controller 118 may send a message, if possible, to the computer 105, and/or the computer 105 may detect the fault detected by the controller 118 in the block 310. In any event, if the computer 105 detect the fault, then the block 320 may be executed, in which the computer 105, e.g., via an HMI as discussed above, provides a notification to a vehicle operator that a fault has been identified. Such notification may identify the vehicle 101 system or sub-system, e.g., steering, braking, powertrain, etc. in which the fault has been detected, and may also inform the driver to take manual control. The following blocks 325-335 may be executed to allow the driver time to safely take control of the vehicle.

Next, in a block 325, the controller 118 identifies target data from a message 117 to be used in light of a fault with a command message 116 detected in the block 310. For example, a target data message 117 may be provided according to a format by which the controller 118 may parse a target value, time parameter, distance parameter, function coefficients, parameter boundaries, and/or supporting collected data 115, such as described above. Further, the controller 118 generally uses a last target data message 117 received before a fault is detected in a target data message 117, e.g., using known error checking mechanisms.

Next, in a block 330, the controller 118 uses the target data from the message 117 to execute a local control loop to reach a target value in the target data message 117. For example, where a fault has been detected in a command message 116, a brake controller 118 could be provided with a target deceleration rate in a target data message 117. Further, the brake controller 118 could receive data 115 from one or more data collectors 110 concerning a vehicle 101 speed and/or rate of deceleration. For example, such information could be provided using CAN messages or the like, or via a speed measurement data collector 110 communicatively coupled to the controller 118. Accordingly, the brake controller 118 could make an adjustment to vehicle 101 brakes, i.e., apply the brakes to decelerate the vehicle 101, then measure the rate of deceleration, e.g., by receiving data 115 relating to vehicle 101 velocity as well as measuring passage of time, or by receiving data 115 relating to vehicle 101 deceleration. The brake controller 118 could then make a further adjustment or adjustments, using such a closed loop process, to achieve the target data value, in this case, the target deceleration rate.

To extend the foregoing example, the message 117, as discussed above, could additionally include a time and/or distance parameter and function coefficients, as well as possibly a function (and/or such function could be stored in a memory of the controller 118), where the function provides a velocity and/or acceleration profile for the vehicle 101 as a function of time. Accordingly, the brake controller 118 could make an adjustment to a vehicle 101 deceleration rate, i.e., apply the brakes, according to a piecemeal function or the like specifying a velocity for the vehicle 101 as a function of time.

Moreover, if a boundary parameter is provided, e.g., in the example of a brake controller 118 a boundary parameter could limit a deceleration rate, then in this instance the closed loop control process could further detect whether the boundary parameter was met or being approached. If so, the brake controller 118 could reduce application of brake pressure to avoid exceeding the boundary parameter and/or to reduce a deceleration rate to below the boundary parameter.

In another example, the controller 118 could be a controller for a steering system, e.g., an EPAS system. In this example, a message 117 generally includes a curvature target for the steering controller 118 to achieve for the vehicle 101. For example, the computer 105 may determine such curvature target based on a planned heading of the vehicle 101 and/or a known safe heading for the vehicle 101, e.g., based on GPS and/or map data. Further, the message 117 could further include a time and/or distance parameter dictating a time that the curvature was to be followed, and possibly also a piecewise function describing a desired curvature trajectory as a function of time. Possible boundary parameters could provide a maximum steering angle for the vehicle 101. Accordingly, the controller 118 could provide one or more steering angles at appropriate times to maintain the desired curvature.

Further, the example of a steering controller 118 can be used to illustrate how a piecewise function could be based on two or more target values in a message 117 for two or more specified time and/or distance parameters in the message 117. For example, a piecewise function could be based on GPS and/or map data that indicated a planned vehicle steering curvature changing over time, e.g., a vehicle could be in the process of changing lanes when a fault is detected, whereupon the piecewise function could indicate a curvature for a period of time to complete the lane change, and then no or little curvature, or a curvature based on a curvature of a road being traversed.

In yet another example, the controller 118 could be a controller for a powertrain control module (PCM). In this example, as in the example of the brake controller 118, a provided target value could be a velocity target. Similarly, a time and/or distance parameter and a piecewise function could be provided, along with boundary values for vehicle 101 acceleration and deceleration. Accordingly, a PCM 118 could follow a closed loop process similar to that described above for the brake controller to guide the vehicle 101 to a target velocity.

In any event, as a local control loop is executed in the block 330, in a block 335, the controller 118 determines whether a target value has been reached. If so, the process 300 ends. Otherwise, the process 300 returns to the block 330 four further execution of the local control loop.

CONCLUSION

Computing devices such as those discussed herein generally each include instructions executable by one or more computing devices such as those identified above, and for carrying out blocks or steps of processes described above. For example, process blocks discussed above are embodied as computer-executable instructions. The phrase "configured to" herein, e.g., when a device, system, or computer is described as "configured to" perform a certain operation, generally means that the device is positively programmed or otherwise instructed to perform such operation.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a controller for a vehicle sub-system, comprising a processor and a memory, the memory storing instructions executable by the processor to:
   receive a first message and a second message, wherein the first message includes at least a command for the controller, and the second message includes at least a target value for the controller to achieve, wherein the target value is provided along with a series of values and a corresponding set of parameters according to which additional target values can be estimated, the parameters including at least one of a time traveled parameter and a distance traveled parameter;
   detect a fault with respect to the first message; and
   locally determine an adjustment to the sub-system to achieve the target value.

2. The system of claim 1, wherein the vehicle sub-system is one of a steering sub-system, a braking sub-system, and a powertrain sub-system.

3. The system of claim 1, wherein the fault is at least one of a failure to receive the message, an error in the message, and a sending system fault.

4. The system of claim 1, wherein the target value is one of a velocity, acceleration, a deceleration, a curvature, a wheel torque, an output shaft torque, an engine torque, and a steering wheel angle.

5. The system of claim 1, wherein the second message further includes a boundary value limiting a quantity to be attained by the sub-system during the adjustment.

6. The system of claim 1, further comprising a vehicle computer including a processor and a memory, the computer configured to send the first message and the second message to the controller.

7. The system of claim 5, wherein the boundary value is one of a velocity, acceleration, a deceleration, and a curvature.

8. A method, comprising:
   receiving, in a vehicle sub-system controller, a first message and a second message, wherein the first message includes at least a command for the controller, and the second message includes at least a target value for the controller to achieve, wherein the target value is provided along with a series of values and a corresponding set of parameters according to which additional target values can be estimated, the parameters including at least one of a time traveled parameter and a distance traveled parameter;
   detecting a fault with respect to the first message; and
   locally determining an adjustment to the sub-system to achieve the target value.

9. The method of claim 8, wherein the vehicle sub-system is one of a steering sub-system, a braking sub-system, and a powertrain sub-system.

10. The method of claim 8, wherein the fault is at least one of a failure to receive the message, an error in the message, and a sending system fault.

11. The method of claim 8, wherein the target value is one of a velocity, acceleration, a deceleration, a curvature, a wheel torque, an output shaft torque, an engine torque, and a steering wheel angle.

12. The method of claim 8, wherein the second message further includes a boundary value limiting a quantity to be attained by the sub-system during the adjustment.

13. The method of claim 8, further comprising sending the first message and the second message to the controller from a vehicle computer.

14. The method of claim 12, wherein the boundary value is one of a velocity, acceleration, a deceleration, and a curvature.

15. A system, comprising a controller for a vehicle sub-system, comprising a processor and a memory, the memory storing instructions executable by the processor to:
   receive a first message and a second message, wherein the first message includes at least a command for the controller, and the second message includes at least two target values for the controller to achieve, wherein the second message further includes at least one of a time parameter and a distance parameter, and also coefficients for a function with sub-functions, each of the sub-functions corresponding to one of the target values as well as at least one of the parameters;
   detect a fault with respect to the first message; and
   locally determine an adjustment to the sub-system to achieve the target values by using the sub-functions.

16. The system of claim 15, wherein the vehicle sub-system is one of a steering sub-system, a braking sub-system, and a powertrain sub-system, and the target value is one of a velocity, acceleration, a deceleration, a curvature, a wheel torque, an output shaft torque, an engine torque, and a steering wheel angle.

17. The system of claim 15, wherein the fault is at least one of a failure to receive the message, an error in the message, and a sending system fault.

18. The system of claim 15, wherein the second message further includes a boundary value limiting a quantity to be attained by the sub-system during the adjustment.

19. The system of claim 18, wherein the boundary value is one of a velocity, acceleration, a deceleration, and a curvature.

20. A method, comprising:
 receiving, in a vehicle sub-system controller, a first message and a second message, wherein the first message includes at least a command for the controller, and the second message includes at least two target values for the controller to achieve, wherein the second message further includes at least one of a time parameter and a distance parameter, and also coefficients for a function with sub-functions, each of the sub-functions corresponding to one of the target values as well as at least one of the parameters;
 detecting a fault with respect to the first message; and
 locally determining an adjustment to the sub-system to achieve the target values according to the sub-functions.

21. The method of claim 20, wherein the vehicle sub-system is one of a steering sub-system, a braking sub-system, and a powertrain sub-system, and the target value is one of a velocity, acceleration, a deceleration, a curvature, a wheel torque, an output shaft torque, an engine torque, and a steering wheel angle.

22. The method of claim 20, wherein the fault is at least one of a failure to receive the message, an error in the message, and a sending system fault.

23. The method of claim 20, wherein the second message further includes a boundary value limiting a quantity to be attained by the sub-system during the adjustment.

24. The method of claim 23, wherein the boundary value is one of a velocity, acceleration, a deceleration, and a curvature.

* * * * *